No. 824,918. PATENTED JULY 3, 1906.
H. B. EARECKSON.
OIL RETAINING DEVICE FOR AXLE BEARINGS.
APPLICATION FILED NOV. 20, 1905.
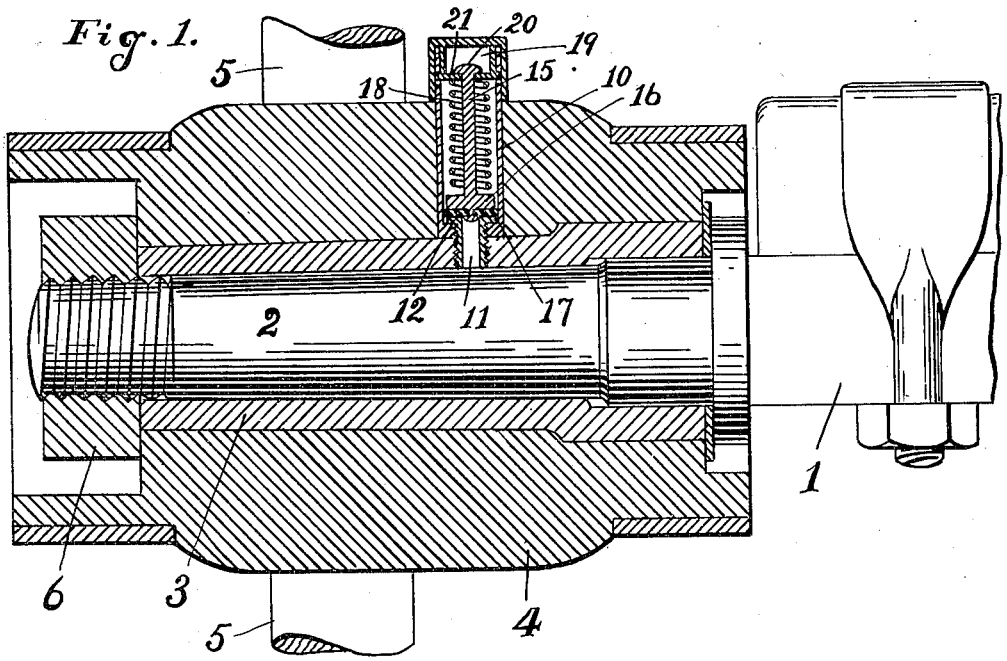
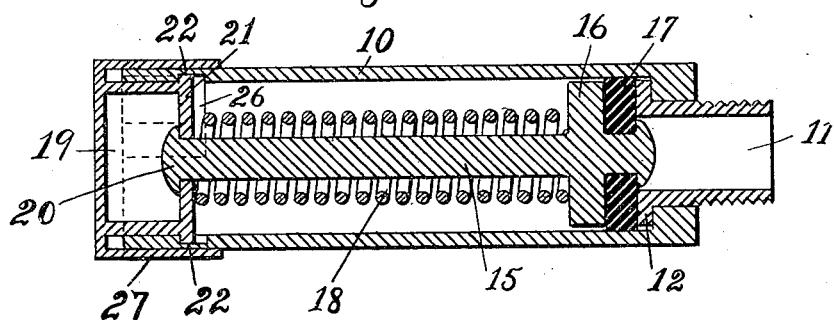
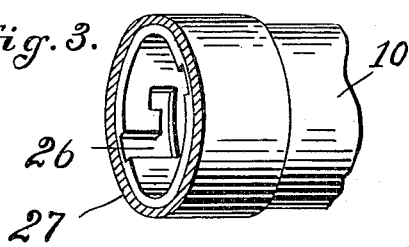
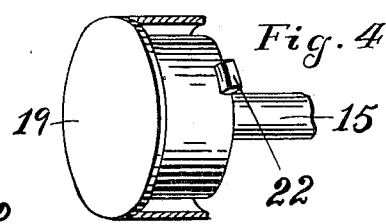
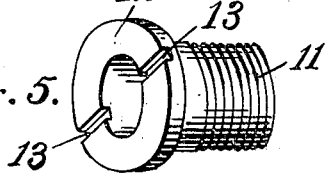
Witnesses
K. Lockwood Nevins
Inventor
H. B. Eareckson,
By
F. M. Wright,
Attorney

UNITED STATES PATENT OFFICE.

HENRY B. EARECKSON, OF SAN FRANCISCO, CALIFORNIA.

OIL-RETAINING DEVICE FOR AXLE-BEARINGS.

No. 824,918.　　　　Specification of Letters Patent.　　　Patented July 3, 1906.

Application filed November 20, 1905. Serial No. 288,200.

*To all whom it may concern:*

Be it known that I, HENRY B. EARECKSON, a citizen of the United States, residing at San Francisco, in the county of San Francisco and State of California, have invented certain new and useful Improvements in Oil-Retaining Devices for Axle-Bearings, of which the following is a specification.

This invention relates to a device for retaining the oil within the bearings of vehicle-wheels, the object of the invention being to provide a device of this character which can be secured to an axle-bearing with a minimum of expense and trouble.

It is peculiarly well adapted for use with a nut-lock which locks the axle-nut to the axle, because it avoids the necessity of removing the nut-lock when it is desired to lubricate the bearing.

In the accompanying drawings, Figure 1 is a longitudinal section of the bearing, a portion of the axle itself being shown in side elevation. Fig. 2 is a longitudinal section of the lubricator detached. Fig. 3 is a perspective view of the upper end of the casing of the lubricator. Fig. 4 is a perspective view of the plunger-lock. Fig. 5 is a perspective view of the nozzle.

Referring to the drawings, 1 represents an axle and 2 the spindle thereof, around which is the skein 3 within the hub 4 of the wheel, of which spokes 5 are here shown.

6 is the axle-nut.

Through the hub of the wheel is bored in a radial direction a cylindrical hole, and at the bottom of said hole is tapped a similar hole in the skein. Into the larger hole in the hub is driven the cylinder-casing 10 of the lubricator. When this has been driven into place, a nozzle 11 is inserted in the bottom of the lubricator, said nozzle passing through a reduced hole in the bottom of the lubricator-casing and having a flange 12 abutting against the shoulder formed by said reduced opening. The nozzle is threaded on the outside and is screwed into the tapped hole in the skein by means of the diametrically alined grooves 13 in the top of the flange 12. There is now inserted in the lubricator-casing a plunger having a stem 15, a disk or head 16, and a gasket 17, supported against said disk. A coiled spring 18 surrounds said stem and presses between said disk and the lower surface of a hollow locking-cap 19, having a cylindrical side or flange surrounding the end of the cylinder. The stem projects into said hollow lock and is enlarged at the end, as shown at 20. The inner side 21 of the hollow lock is formed with lugs 22, which are adapted to pass into L-shaped recesses 26, cut in the upper end of the casing.

To secure the device to a bearing, a hole is bored transversely entirely through the hub of the wheel until the skein is reached. Then a hole of smaller diameter is tapped through the skein. The cylinder 10 is now inserted in the hole in the hub, and the nozzle or thimble 11 is placed at the bottom of said cylinder and is screwed into the tapped hole in the skein. This firmly secures the casing 10 in position, even though it should not fit tightly within the bore through the hub, nor is this tight fit necessary to prevent the escape of oil from the bearing, as this is prevented by the gasket 17. This construction therefore enables the device to be attached securely without the use of auxiliary fastening devices, such as screws or bolts, and so that substantially the whole of the device is received within the body of the hub, protected from injury by impact. In this position it is used in the following manner: The plunger having been removed, oil is poured into the lubricator-casing, filling also the bearing in the axle. The plunger is then replaced, and the gasket 17 is pressed against the flange of the nozzle. The locking-cap is then given a turn to the right until the lugs 22 reach the enlarged ends of the circumferential portions of the recesses 26, when pressure is removed from the cap and the lugs are allowed to return under the action of the spring 18, seating themselves in said ends, thus preventing accidental displacement of the lugs.

I claim—

1. A device of the character described comprising, in combination with a wheel-hub having a radial hole, and a skein having a smaller radial tapped hole at the end of the first hole, a cylinder in the first hole having a reduced opening at its inner end, a nozzle or thimble screwed in the hole through the skein and having a flange lying over the shoulder formed by said reduced opening, a stem inside the cylinder, a gasket secured to the inner end of the stem for closing said nozzle, means carried by the outer end of the stem for moving it to open said nozzle, and a coiled spring within the cylinder between the gasket and means, substantially as described.

2. A device of the character described comprising, in combination with a wheel-hub having a radial hole, and a skein having a smaller radial tapped hole at the end of the first hole, a cylinder in the first hole having a reduced opening at its inner end, a nozzle or thimble screwed in the hole through the skein and having a flange lying over the shoulder formed by said reduced opening, a stem inside the cylinder, a gasket secured to the inner end of the stem for closing said nozzle, a locking-cap secured to the outer end of the stem and provided with lugs, the cylinder being provided with L-shaped recesses engaged by said lugs, and a spring between said cap and gasket, substantially as described.

3. A device of the character described, comprising, in combination with a wheel-hub having a radial hole, and a skein having a smaller radial tapped hole, at the end of the first hole, a cylinder in the first hole having a reduced opening at its inner end, a nozzle or thimble screwed in the hole through the skein and having a flange lying over the shoulder formed by said reduced opening, a stem inside the cylinder, a gasket secured to the inner end of the stem for closing said nozzle, a hollow locking-cap into which the enlarged outer end of the stem projects, a coiled spring around the stem between said cap and gasket, the cap being provided with lugs and the cylinder with L-shaped recesses engaged by said lugs for locking the cap in position, and the cap having a cylindrical outer portion surrounding the end of the cylinder, substantially as described.

In witness whereof I have hereunto set my hand in the presence of two subscribing witnesses.

H. B. EARECKSON.

Witnesses:
BESSIE GORFINKEL,
ANNIE PETERSON.